3,162,515
DEHYDRATION AND CONCENTRATION
METHOD AND APPARATUS
James S. Connors and Jack R. Fryar, Bartlesville, Okla., assignors to Phillips Petroleum Company, a corporation of Delaware
Filed Dec. 28, 1960, Ser. No. 78,935
2 Claims. (Cl. 55—32)

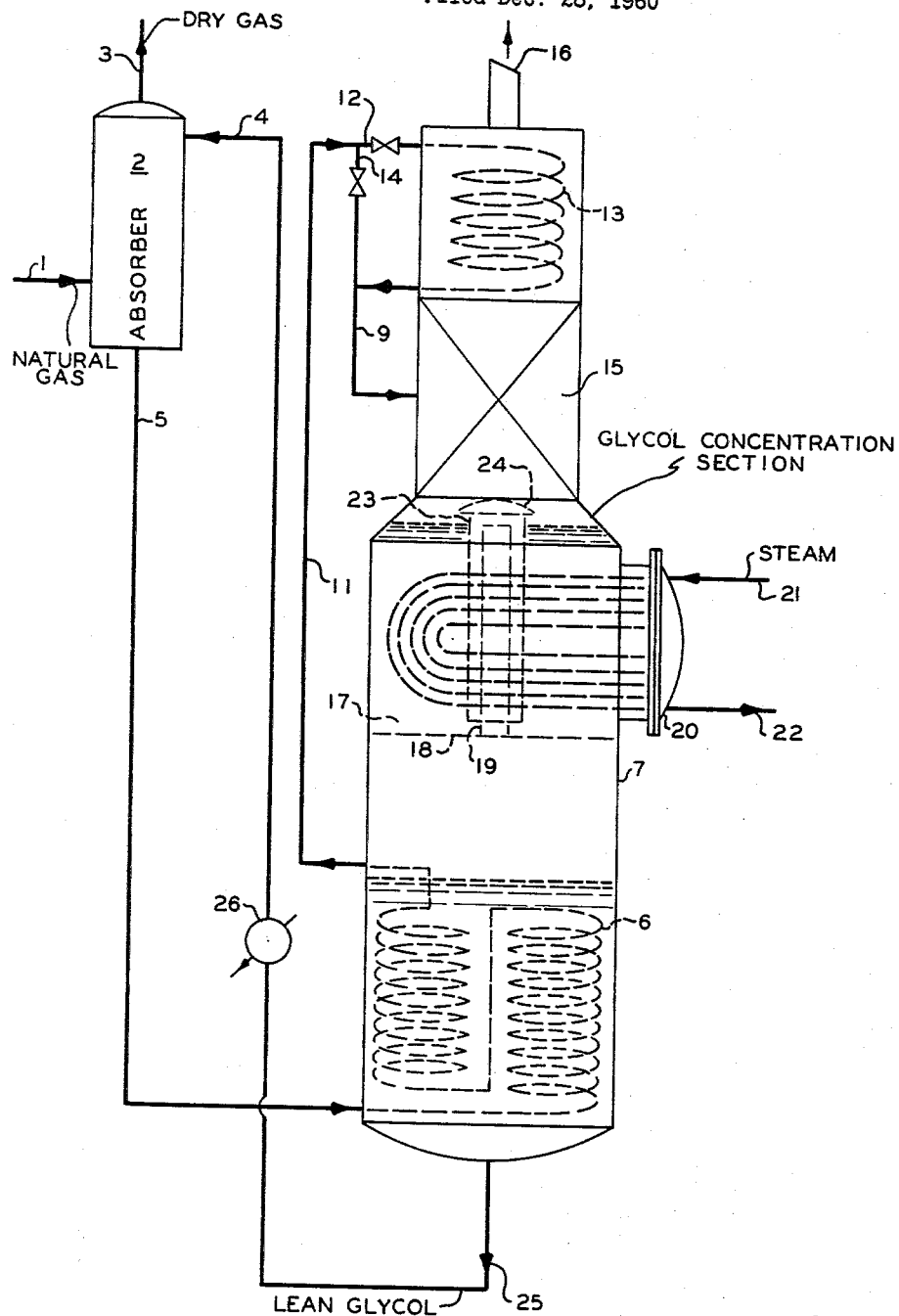

This invention relates to dehydration. It also relates to concentration of a liquid, for example, a dehydration agent. It also relates to an apparatus suitable for dehydration. It also relates to an apparatus for the concentration of a liquid, for example, a dehydration agent.

In one of its aspects, the invention relates to a method for the dehydration of a gas or vapor, for example, natural gas, by contacting the same with a lean glycol dehydrating agent or solution in an absorber which can be of conventional design, following which the glycol containing water of dehydration is passed to the lower section of a glycol concentration zone, wherein it is heat exchanged with hot concentrated or lean glycol, then passed at least in part to the top of said zone for heat exchange with outgoing vapors resulting from the concentration of glycol by heating the same, and then passed to an intermediate section of said zone wherein there is maintained a body of glycol undergoing concentration by indirect heat exchange with a heating medium, the concentrated glycol overflowing from said zone and being collected and ultimately withdrawn from the bottom section of said zone. In another of its aspects, the invention relates to apparatus comprising in combination, in addition to an absorber for treating a gas, for example, to dehydrate the same, a combination concentration, heat exchange and surge or storage vessel of essentially upright design having a heat exchange coil in the bottom portion thereof, a heat exchange coil in the top portion thereof, and a heat exchange section in the intermediate portion thereof, the coil in the bottom and the coil in the top of said vessel being interconnected in a manner to provide for flow of fluid to be concentrated through the coil in the bottom section and then through the coil in the top section for indirect heat exchange respectively with concentrated glycol and with vapors emanating from glycol under concentration and to discharge such heat exchanged glycol into said intermediate section wherein heat is supplied to concentrate the glycol to a desired extent, and said intermediate section having an overflow means adapted to maintain in said section a body of glycol under concentration. In another of its aspects, the invention provides in the apparatus, in the intermediate or concentration section, an overflow pipe, the upper end of which is substantially above a heat exchange coil or unit, said pipe being surrounded by a pipe of larger diameter extending from above the liquid level to down near, but not touching, the bottom of said section, and a cap member which prevents downcoming liquid from entering into the upper ends of said pipes, diameters of which are such as to provide an overflow annulus which will allow most concentrated glycol or other liquid to flow from the bottom of the intermediate section upwardly through the annulus and down through the overflow pipe into said bottom section of said concentration vessel or zone.

Various methods and apparatus for the adsorption from gases or vapors or even from liquids of water or other materials are known. Also, various methods and apparatus for the concentration of a dehydrating or other agent are also known. There is a constant demand for improved methods and apparatus of the type here discussed to more efficiently and/or to more economically effect the operations involved. It is necessary to provide fairly large size apparatus for the treatment of large quantities of, say, natural gas which are, say, fed to a pipeline for transporting long distances. Specifications are rigorous and water content must be controlled. For example, in one operation, it is necessary to dry 10½ million standard cubic feet per day of residue sales gas at 48 pounds per square inch and at 90° F. to a dew point of at least 20° F. below the prevailing atmospheric wet bulb temperature with the lowest required dew point being 30° F. It will be appreciated that investment costs can rapidly mount and are high.

Other aspects, objects, and the several advantages of the invention are apparent from a study of this disclosure, the drawing and the appended claims.

We have now conceived of a unitary operation and apparatus which possesses a number of operational and economic advantages or factors. Especially, we have conceived of a method and design which composites various operations so that a minimum number of steps and a minimum number of pieces of equipment are involved. We have conceived that the water-rich glycol can be used to remove heat from vapors passing out from an earlier-stripped portion of glycol and that these vapors can be caused to condense and form a reflux to be used in a stripping section. Further, we have conceived that this condensing shall occur within a unitary zone or vessel as later described. We have also conceived that in the zone or vessel of unitary design, the dehydrating or other agent shall be forced to pass through the heat exchanger and then up through an overflow zone or section so that most concentrated material only will pass from the heat exchanger or concentration section. Also, a measure of control of motion or flow of the liquid undergoing concentration is accomplished by this operation or design. Further, we have conceived that a heat exchanger be provided below the heating or stripping zone of the concentrator in which to pick up heat and also to store a surge quantity of concentrated agent. Thus, in a single tower, we have arranged a coil for indirect heat exchange in a bottoms section, a coil for indirect heat exchange in the top, and a coil or heat exchanger for indirect heat exchange in an intermediate portion of the tower. Liquid to be concentrated is heat exchanged by first passing through the lowermost coil, then through the uppermost coil, at least in part, and then into a space, which can be packed, located intermediate the upper coil and the intermediate coil. Ultimately, the liquid to be concentrated, which has now been preheated, is further heated by the intermediate heat exchange coil and concentrated to a desired extent. It then overflows by means of the overflow, here discussed, and drops to the bottom of the tower.

It is an object of this invention to provide a method of dehydration. It is another object of this invention to provide a method of concentrating a liquid, for example, a dehydration agent. It is a further object of this invention to provide for the dehydration of natural gas. It is a still further object of this invention to provide for the concentration of a dehydrating agent which has been used for dehydrating natural gas, for example, a glycol; it is a still further object of this invention to provide an improved dehydration and concentration method. It is a further object of this invention to provide an improved dehydration and concentration apparatus. It is a still further object of this invention to provide method and means which will economically process large quantities of a gas or vapor of liquid needing to be dehydrated or otherwise processed, following which there is a concentration or stripping of the agent used in the method. A still further object of the invention is to provide a concentration vessel of unitary design to accomplish several functions of heat exchange and handling of flow of fluid therein.

The invention is applicable to the use of a glycol to dehydrate natural gas-containing moisture. Therefore, it will be described in connection with such an application.

One skilled in the art in possession of this disclosure, having studied the same, will realize that various dehydrating agents can be used and that various materials can be dehydrated. Thus, the invention has wide applicability and is limited only by the appended claims.

According to the present invention, after a dehydrating agent, such as a glycol, has been contacted with a gas such as natural gas, it is passed to the bottom section of a concentration zone and therein indirectly heat-exchanged with concentrated treating agent earlier processed, then the thus heat-exchanged agent is passed to the upper portion of said concentration zone and therein heat exchanged with rising vapors in an amount sufficient to cause condensation sufficient to provide a desired degree of reflux in the upper section of the zone, then the thus further heat-exchanged agent is passed downwardly and discharged into the tower above an intermediate portion thereof in which it is heated to concentrate it, the agent being finally allowed to overflow from the last heating into the bottom section of the concentration zone.

Also, according to the invention, there is provided an apparatus of unitary design comprising in combination a substantially upright tower or vessel, a heat exchange coil in the bottom portion of said vessel, a heat exchange coil in the upper or top portion of said vessel, piping to pass fluid from the lower coil into and through the upper coil and from the upper coil, into the vapor space above an intermediate portion of said tower, a further heat exchanger in an intermediate portion of said tower, means in said tower to accumulate and to retain all but an overflow amount of liquid in said intermediate portion of said tower so adapted and arranged as to concentrate the liquid retained therein and to overflow essentially only concentrated liquid therefrom into the bottom portion of said tower.

Referring now to the drawing, natural gas passes by way of pipe 1 to absorber 2, wherein it is contacted with lean glycol introduced by 4. Dry gas passes to pipeline or other utilization by 3. The used glycol is passed by pipe 5 into coil 6 located in the bottom of tower 7. After heat exchange with lean glycol in the bottom of tower 7, the used glycol passes by pipe 11 and at least in part by pipe 12 into coil 13 in the top of tower 7. At least another part of preheated glycol, when desired, is passed by pipe 14, together with further preheated glycol from pipe 13 into packed section 15 of tower 7. The packing in section 15 can be conventional. According to the invention, the glycol passing through pipe 13 will remove heat from the water vapor passing upwardly through section 15 and around coil 13 and ultimately out from the tower by pipe 16. This creates a reflux for wetting down of the packing in section 15. Still further, according to the invention, the glycol is passed downwardly into section 17, which is formed by means of partition 18, and riser pipe 19. This section contains a heat exchanger 20 to which steam is fed by 21 and from which used steam or condensate is removed by 22. The riser pipe 19 extends up to a level which desirably is above the level of the heat exchanger 20. Surrounding pipe 19, according to the invention, is pipe 23, which is covered at its upper end, as in this embodiment, with cap 24 which is affixed to the upper end of pipe 23 so as to permit communication between the exterior and interior of pipe 23 but prevents downflowing agent from entering into the upper ends of pipes 19 and 23. By this arrangement, according to the invention, the most concentrated glycol or other agent is drawn off the bottom of section 17 and, by overflow, drops through pipe 19 into surge section at the bottom of tower 7. Lean glycol or agent is passed by pipe 25, cooler 26 in pipe 4 to absorber 2.

It is a feature of the invention that by the use of pipes 19 and 23, there is accomplished a downflow of liquid past heat exchanger coil 20, albeit convection due to heat exchange exists. This give a very efficient heat exchange and allows the drawing off of the most concentrated material from the bottom of section 17.

It will be understood by one skilled in the art in possession of this disclosure and having studied the same that several pipes 19 and 23 can be provided in section 17. It is within the scope of the invention to modify pipes 19 and 23 to remove glycol from any level within section 17. Indeed, several removal levels can be operated at one time depending upon the particular type of heating, degree of turbulence, or convection, etc.

A study of this disclosure will show that the advantages of the present invention are several. Thus, the rich glycol is heat exchanged in the same column or vessel that is used for stripping the glycol. This eliminates expense of construction, as well as upkeep of several vessels. There are no externally exposed heat exchangers for the functions of heat exchange taking place in the concentration operations. The dual function of heat exchanging in the top of the concentrator tower and providing reflux for a packed section below results in a capturing of heat, as well as entrained agent. The use of the overflow pipe arrangement forces the glycol or agent to pass through the heat exchanger, causing removal from the concentrator section 17 of the most thoroughly stripped glycol. Finally, the heat exchange in the bottom of the tower also provides the surge for the lean glycol. Thus, in one tower or unitary apparatus or vessel, there have been combined neatly several concepts and the method of the invention can be practiced with great advantage and economy.

The invention may be operated by passing 10,500,000 cubic feet of gas at standard temperature and pressure per day saturated with water at 48 p.s.i.g. and 90° F. through line 1 into absorber 2. 10 g.p.m. of 96 percent glycol at 95° F. is passed from line 4 into absorber 2. The dew point of the gas passing through line 3 is at least 20° F. below the prevailing atmospheric temperature with a minimum dew point of 30° F. The spent glycol solution from absorber 2 passes through line 5 at 100° F. into coil 6. The spent glycol flows from coil 6 through line 11 at 130° F. A portion of the glycol from line 11 flows through line 14 and the remainder through line 12 into coils 13. Enough glycol is passed through coils 13 to maintain an outlet temperature from coils 13 of about 160° F. The glycol from coil 13 and line 14 is passed through line 9 into tower 15. Steam is passed through line 21 at 366° F. to maintain a temperature of 325° F. in section 17 of tower 7. The glycol is stripped of water in section 17. The glycol passes down around the coils in section 17, up through the annular space between conduits 19 and 23 and overflows down through conduit 19 into the bottom of column 7.

In the dehydration of gas, as described in connection with this invention, diethylene glycol was selected as the drying agent to be used in connection with the live steam which was available.

Reasonable variation and modification are possible within the scope of the foregoing disclosure, the drawing, and the appended claims to the invention, the essence of which is that there have been provided method and means for the dehydration or treating of a gas vapor or liquid and for concentrating or stipping a treating agent, the method involving heat exchanging the used agent in the bottom of a concentration zone, further heat exchanging the used agent in the top of a concentrator zone, and finally, concentrating the used agent in an intermediate portion of said zone, overflowing the concentrated agent from the intermediate portion of said zone to the bottom of said zone from which it is used, as desired; the apparatus comprising essentially, in addition to a treating vessel, a vessel for concentration or stripping composed of a shell in substantially upright position, said shell containing a heat exchanger in the bottom, a heat exchanger in the top, a packed section below the top, and above an intermediate portion which contains a further heat exchanger, in a preferred embodiment, the intermediate section being provided with an overflow, all substantially as set forth and herein described.

We claim:

1. A method for the dehydration of natural gas which comprises contacting said gas with a liquid dehydration agent in a dehydration zone passing said agent containing water resulting from dehydration of said natural gas to the bottom of an agent concentration zone, in the bottom of said agent concentration zone heat exchanging said agent containing water indirectly with hot concentrated agent thus heating said agent containing water, passing the thus heated dehydration agent containing water to the top of said agent concentration zone and therein indirectly heat exchanging the same with vapors rising from agent undergoing concentration in an intermediate concentrating section, thereby creating a reflux which is passed downwardly in said agent concentration zone, thus further heating said dehydration agent containing water, then introducing the thus further heated dehydration agent containing water into a contact section beneath said top of said agent concentration zone and above said intermediate concentrating section of said agent concentration zone into direct contact with vapors rising from said concentrating section, still further heating said dehydration agent containing water, then passing said thus heated and thus directly contacted agent to said concentrating section, therein concentrating said agent and then passing the most concentrated portion of said agent in said concentrating section from a bottom of said concentrating section upwardly through an annulus of two concentric pipes, the outermost of which is closed to the concentrating liquid along its entire length and extends to a point above the surface of the liquid at the top of said concentrating section and open to said concentrating liquid only near to the bottom of said concentrating section, the innermost of said two concentric pipes extending upwardly from the bottom of said concentrating section and being in open communication with the bottom of said agent concentration zone, and then downwardly through the innermost of said concentric pipes to the bottom of said concentration zone.

2. An apparatus comprising substantially an upright column, a heat exchanger coil in the bottom of said column, a heat exchanger coil in the top of said column, means for introducing fluid into said heat exchanger coil in the bottom of said column, means for passing fluid serially outside of said column from said heat exchanger coil in the bottom of said column to said heat exchanger coil in the top of said column and from said heat exchanger coil in the top of said column into a contact section below said heat exchanger coil in the top of said column and above an intermediate portion of said column, means for introducing liquid into said heat exchanger in the top of said column, means for introducing liquid into said contact section, which is opened at the bottom thereof to said intermediate portion of said column, a heat exchanger in said intermediate portion of said column adapted to be surrounded by fluid passed into said column from last said heat exchanger coil and into the space surrounding said heat exchanger in said intermediate portion of said column, a partition below said heat exchanger in said intermediate portion of said column separating said bottom and top portions of said column and providing a bottom for said intermediate portion, a downcomer pipe in the intermediate portion of said column, said downcomer pipe being adapted to discharge contents removed from the bottom of said intermediate section into the bottom portion of said column below said partition, said downcomer pipe being extended upwardly from an opening in said partition and being adapted to allow fluid which rises above the top of said downcomer pipe to flow downwardly through the length of said downcomer pipe and into said column, said downcomer pipe being surrounded along a substantial portion of its length by a pipe of larger diameter from a level above the top end of said downcomer pipe, and therefore above the level of liquid in said intermediate portion in normal operation, downwardly toward but not reaching said partition, thus providing an annulus between the pipes, in a manner to provide for flow of liquid from the bottom of said intermediate section upwardly through said annulus over the top of said downcomer and downwardly through said downcomer pipe into the bottom portion of said column, a cap affixed to the upper end of said pipe of larger diameter being adapted to cover said pipe of large diameter and thus prevent downward flowing agent from entering the upper ends said downcomer pipe and said pipe of larger diameter, means in the upper portion of said outer pipe at said cap to allow vapors to pass from the outer portion of said pipe of larger diameter to the inner portion of said pipe of larger diameter.

References Cited in the file of this patent

UNITED STATES PATENTS

| | | |
|---|---|---|
| 117,445 | Morris | July 25, 1871 |
| 1,789,059 | Tifft | Jan. 13, 1931 |
| 1,934,029 | Asbury | Nov. 7, 1933 |
| 2,302,993 | Graham | Nov. 24, 1942 |
| 2,428,643 | Young | Oct. 7, 1947 |
| 2,718,215 | Eckstrom | Sept. 20, 1955 |
| 2,742,102 | Eichmann | Apr. 17, 1956 |
| 2,750,331 | Meyers | June 12, 1956 |
| 2,787,335 | Irvine | Apr. 2, 1957 |
| 2,809,717 | Schmalenbach | Oct. 15, 1957 |
| 2,812,827 | Worley et al. | Nov. 12, 1957 |
| 2,812,830 | Stattler et al. | Nov. 12, 1957 |
| 2,919,556 | Mulder | Jan. 6, 1960 |
| 3,020,214 | Beduhn et al. | Feb. 6, 1962 |
| 3,105,748 | Stahl | Oct. 1, 1963 |